United States Patent [19]

Worsley

[11] Patent Number: 5,042,244
[45] Date of Patent: Aug. 27, 1991

[54] ROOF TOP CHAIN

[75] Inventor: Gail G. Worsley, Clinton, Iowa

[73] Assignee: Drives-Incorporated, Fulton, Ill.

[21] Appl. No.: 610,074

[22] Filed: Nov. 7, 1990

Related U.S. Application Data

[63] Continuation of Ser. No. 525,852, May 21, 1990, abandoned.

[51] Int. Cl.⁵ .............................................. F16G 13/06
[52] U.S. Cl. .......................................... 59/78; 59/93; 198/851
[58] Field of Search ...................... 59/78, 93; 198/850, 198/851

[56] References Cited

U.S. PATENT DOCUMENTS

| | | | |
|---|---|---|---|
| 2,954,113 | 9/1960 | Hibbard et al. | 198/851 |
| 2,955,700 | 10/1960 | Badger | 198/851 |
| 3,842,968 | 10/1974 | Owens | 198/851 |
| 3,910,406 | 10/1975 | Pulver et al. | 198/851 |
| 3,944,059 | 3/1976 | Garvey | 198/851 |
| 4,096,943 | 6/1978 | Gentsch | 198/851 |
| 4,301,915 | 11/1981 | Michalik et al. | 198/851 |

FOREIGN PATENT DOCUMENTS 731361 6/1955 United Kingdom ................ 198/851

Primary Examiner—David Jones

[57] ABSTRACT

One piece, molded, snap-fit roller chain cap of polymer material can be removably affixed to roller chain. The cap includes a pair of legs which, when affixed to a link of the chain, straddle the side plates thereof. Each of the plates and its associated leg have interlock portions. In the preferred form, the legs extend slightly below the bottom surfaces of the plates when the legs and plates are interlocked.

2 Claims, 3 Drawing Sheets

ROOF TOP CHAIN

The present application is a continuation of my pending application, Ser. No. 07/525,852 filed May 21, 1990, entitled ROOF TOP CHAIN, The present invention relates to capped transfer or roller chain of the type used for transporting items such as lumber from point to point.

BACKGROUND OF THE INVENTION

Capped roller chain generally comprise a standard type roller chain wherein an overlay (referred to as a cap or "roof top") spans the top of the two side bars or plates forming each link of the chain. Typically, two or more lengths of such chain extend in spaced parallel relation and are driven at the same speed. Items to be transported are placed transversely across the chain lengths and are carried thereby. In the prior art, the roof top or cap has been formed by an upper extension of one of the side bars of each link. Alternatively, metal caps have been welded to the side plates of the links.

Metal caps have the drawback of scratching or otherwise marring the surface of items being loaded thereon for transport. More recently, ultra high molecular weight polyethylene roof top caps have been provided to overcome the aforementioned problem. Such plastic caps include a steel clamp which is used in welding the caps to the side bars of the chain links.

In order to support the loads carried by the chain, the chain typically runs atop a metal support plate or channel. More recently, in order to reduce noise, plastic chain support channels have been introduced to eliminate the metal to metal contact between chain and support.

SUMMARY OF THE INVENTION

In accordance with one aspect of the present invention, there is provided a snap fit attachable cap for roller chain, the side plates of which are modified to facilitate the snap fit connection.

In the illustrated embodiment, the cap comprises a unitary body of non-abrasive high strength material having an upper body portion which transversely spans the two side plates of each link. A pair of leg portions depend from the upper body portion and are spaced apart a distance to straddle the side plates (i.e., receive the side plates therebetween). Each of the leg portions includes a button portion formed therealong. Recepticals for the buttons are provided in the side plates of each link to provide a snap fit connection between link and cap.

In the presently preferred form, the legs of the cap extend below the side plates of each link to provide a smooth, low friction load carrying area for the chain to ride on.

The cap of the present invention can be made of high density polyethylene, a material which exhibits the desired low-friction, non abrasive characteristics while being extremely tough and yet sufficiently flexible to permit the legs to outwardly flex when affixing and removing the cap.

Other features and advantages of the invention will be apparent from the following description and claims and are illustrated in the accompanying drawings which show structure embodying preferred features of the present invention and the principles thereof, and what is now considered to be the best mode in which to apply these principles.

BRIEF DESCRIPTION OF THE DRAWINGS

In the accompanying drawings forming a part of the specification, and in which like numerals are employed to designate like parts throughout the same.

DESCRIPTION OF PREFERRED EMBODIMENT

Figure 1:
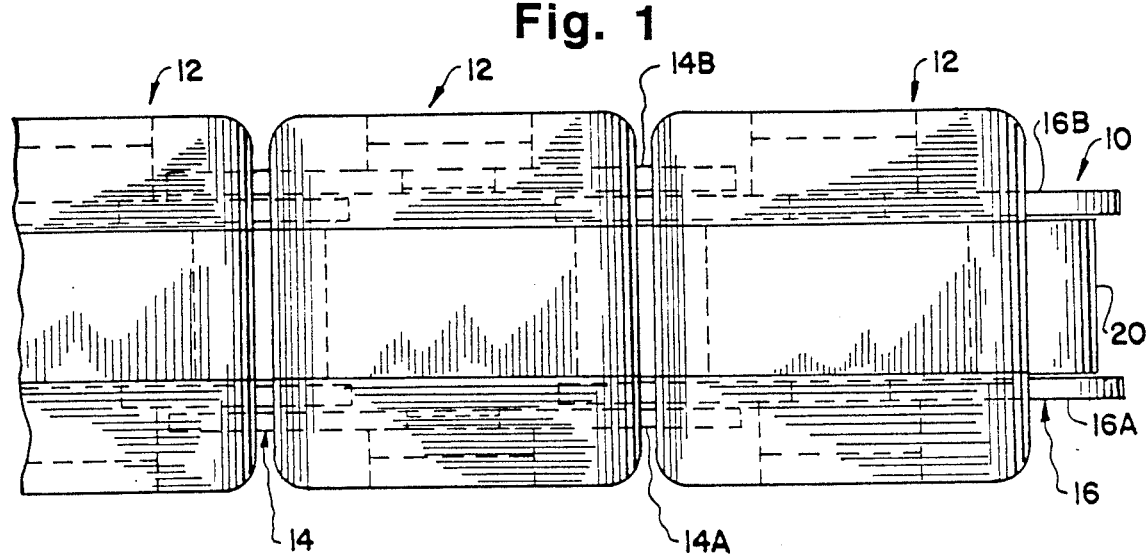
FIG. 1 is a top view of a length of single pitch conveyor roller chain incorporating the roof top cap of the present invention.
Figure 2:
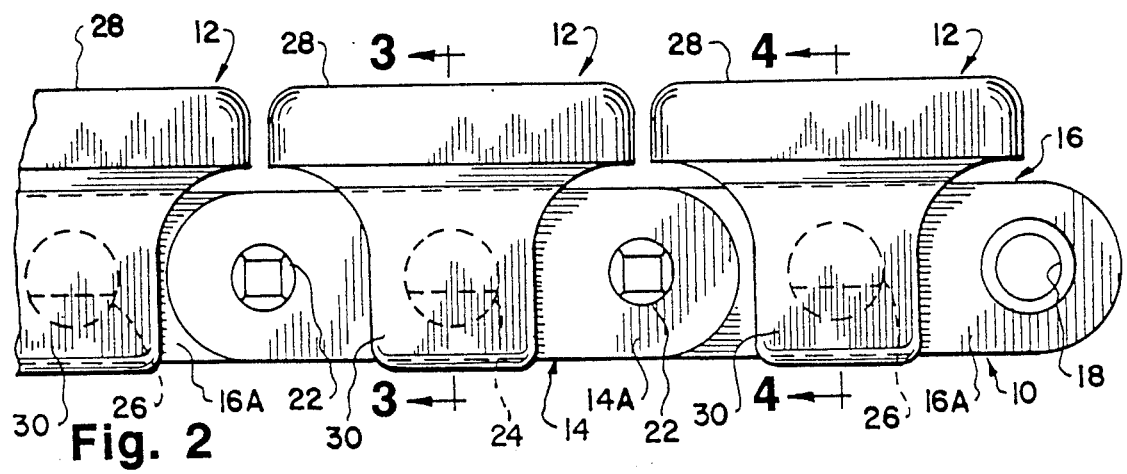
FIG. 2 is a side elevation of the roof top chain of FIG. 1.

With reference to FIGS. 1 and 2, for purposes of illustrative disclosure a length of single pitch conveyor roller chain 10 is shown in combination with a plurality of roof top caps 12. The chain includes alternating pin links 14 and roller links 16. Except as specifically noted hereinafter, the links of chain 10 are of conventional design of the smaller roller type per ANSI standard (see ASME/ANSI B29.4M-1986) and, more particularly, chain known as 81X.

The pin links 14 each include a pair of identical parallel side plates 14A, 14B; the roller links 16 including a pair of identical parallel side plates 16A, 16B. As is conventional, the side plates 16A, 16B of the roller links 16 each have circular apertures near the two opposed ends thereof to receive bushings 18 which carry rollers 20. The side plates 14A, 14B of the pin links 14 also each have apertures near the two opposed ends thereof through which pins 22 extend. As is standard, pins 22 extend through the bushings 18 of the roller links.

Figure 3:
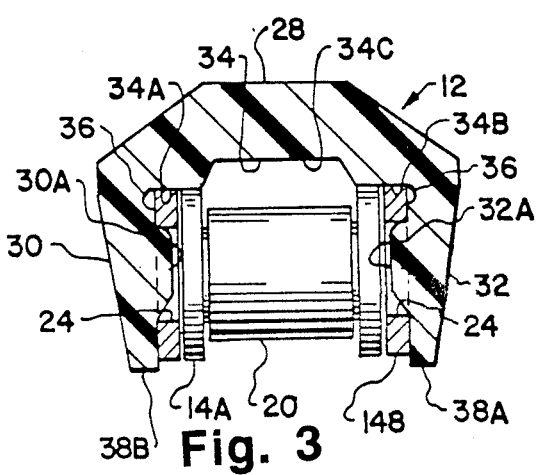
FIG. 3 is a sectional view taken, as indicated, along the line 3—3 of FIG. 2.
Figure 4:
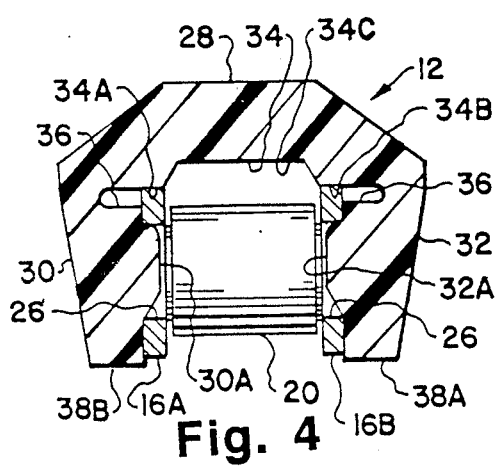
FIG. 4 is a sectional view taken, as indicated, along the line 4—4 of FIG. 2.
Figure 6:
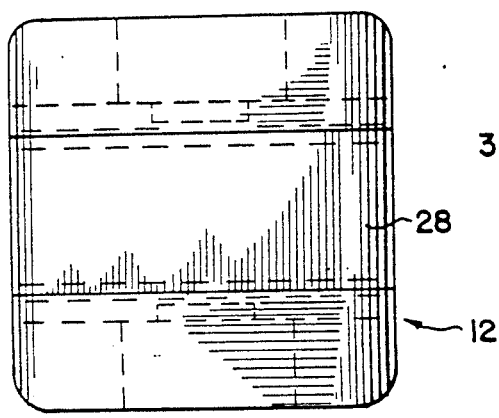
FIG. 6 is a top view of the roof top cap.
Figure 5:
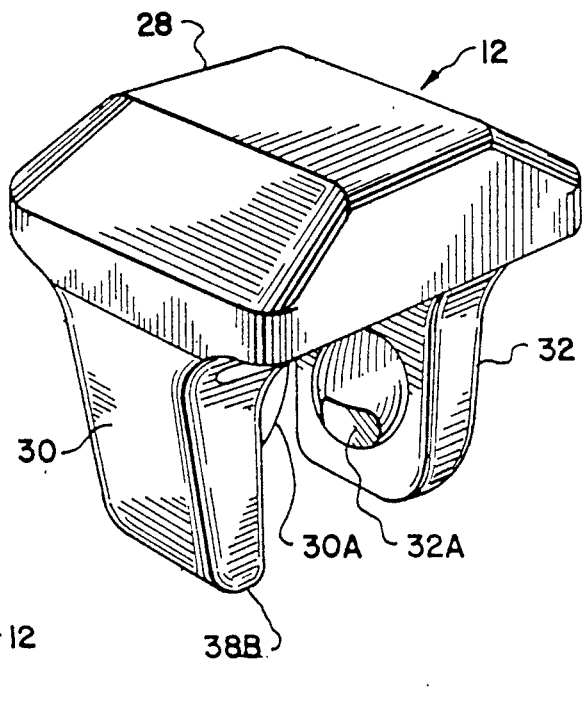
FIG. 5 is a perspective view of the roof top cap.
Figure 7:
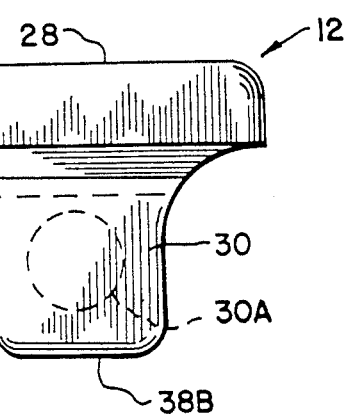
FIG. 7 is a side elevational view of the roof top cap.

The roller chain 10 is modified from standard only in that each of the side plates of the pin links 14 and the roller links 16 include an additional aperture midway between the opposed ends thereof to serve as snap fit female receptical for the caps 12. These additional apertures are shown in dotted outline in FIG. 2 as apertures 26 (in the case of the roller link side plates 16) and aperture 24 (pin link side plates 14), and are best shown in FIGS. 3 and 4. For manufacturing convenience, apertures 24 and 26 are identical in size to the apertures formed in the roller links 16 for receiving bushings 18.

The roof top caps 12 each comprises a unitary body of nonabrasive, low friction, high strength material, preferably high density polyethylene ("HDPE"). The unitary body of each cap 12 includes an upper body portion 28 and a pair of downwardly depending leg portions 30, 32.

As best shown in FIGS. 3 and 4, the upper body portion 28 of the cap body has a transverse dimension at least sufficient to span both the side plates of the pin links and roller links. The opposed depending leg portions 30, 32 of the cap body are spaced apart a distance to accommodate the side plates therebetween. Thus, as is apparent from FIGS. 3 and 4, the spacing between the legs 30, 32 of a cap 12 is of necessity dependent upon whether the cap 12 is to be affixed to a pin link 14 or a roller link 16.

Figure 8:
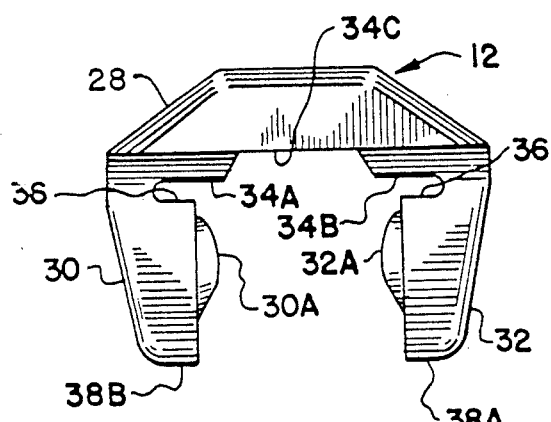
FIG. 8 is an end elevation view of the roof top cap.

Each of the depending legs 30, 32 has on its inner face a bulge or button portion 30A, 32A to fit within apertures 24, 26 of the side plates 14A, 14B of the pin links 14 and side plates 16A, 16B of the roller links 16. The upper body portion 28 of each cap 12 includes an underside surface 34 having side regions 34A, 34B to seat upon the top edges of the side plates of a pin or roller link (as best shown in FIGS. 3, 4 and 8). The side regions 34A, 34B flank a central underside region 34C which is raised relative thereto so as to accommodate the teeth of chain driving sprockets (not shown).

As noted above, the caps 12 preferably are formed of HDPE, a material exhibiting low surface friction but which is extremely tough. In order to afford deflection of legs 30, 32 when the cap 12 is being installed or removed, notches 36 are formed at or near the junction of the leg portions 30, 32 and upper body portion 28. It has been found that HDPE possesses a combination of characteristics (i.e., moldability, strength and elasticity) more desireable than other polymers, such as ultra high molecular weight polyethylene, polypropylene and low density polyethylene. It will be appreciated that the legs 30, 32 must outwardly flex or deflect when affixing the caps to the links and when removing same. The other polymer materials noted exhibited either excessive stiffness or insufficient stiffness.

Caps 12, as is evident, are easily connected to links 14, 16 merely by pushing the caps 12 downwardly onto the links. As the caps 12 are forced down, the legs 30, 32 deflect outwardly as the buttons 30A, 30B engage the outer surfaces of the side plates. The buttons then, when properly oriented relative to apertures 24, 26 are caused to snap into the apertures due to the inherent resiliency of the HDPE material. To facilitate the connection, the bottom portions of the buttons 30A, 32A are appropriately cammed or beveled, as shown.

In the presently preferred embodiment disclosed herein the legs 30, 32 extend below the bottom edges of the side plates of the links (as best shown in FIGS. 2, 3 and 4) and terminate in flat bottom surfaces 38A, 38B. Such bottom surfaces rest upon a horizontal chain support surface or track above which the roller chain 10 extends. The low friction characteristic of the HDPE allows for reduced drag and noisy metal to metal contact is thereby eliminated.

As alluded to above, the roof top chain of the present invention has particular application in the transport of lumber. The lumber is loaded onto parallel lengths of chain from one side thereof in a direction transverse to the direction of chain travel. As a consequence of the manner of loading the lumber, sidewise (or lateral) forces are applied to the chain during the loading operation.

Figure 9:
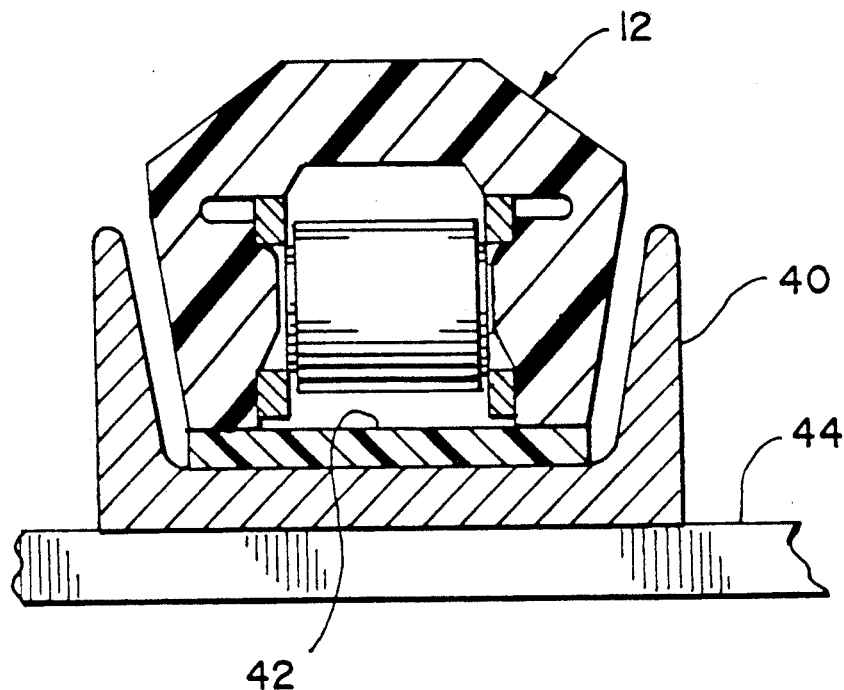
FIG. 9 is a sectional view similar to FIG. 4 but showing the channel guide in relation to the roof top chain.

For the above application, each of the chain lengths is supported by a channel shaped guide such as is shown in FIG. 9 as guide 40. In some instances, if the channel is formed of metal, a strip of plastic, such as strip 42 in FIG. 9, is placed between the channel and the chain to reduce sound and reduce friction. In some instances the channel itself is formed of plastic.

It should be noted with reference to FIG. 9 that the chain in the absence of the roof top caps 12, when subjected to lateral forces such as are applied during loading, is free to slide and/or tip against the flanges (i.e., the upright walls) of the channel 40. At times, such action damages the pin heads securing the roller to the chain side plates creating chain failure. It should also be noted that, with or without the plastic strip 42 as shown in FIG. 9, the bottom edges of the chain side plates cut indentations into the web of the channel guide 40 (or into the plastic strip 42 if present). Such indentations typically are not straight line, but rather tend to curve irregularly along the direction of chain travel. At times the chain tracks along such indentations in wobbly fashion and at times the chain jumps out of the tracks. Either case is detrimental to chain life and increases drag.

The chain illustrated herein is known in the industry as 81X chain, the dimensions of which are well known, the side plate height being 1.125 inches, the side plate thickness being 0.155 inch, the pitch being 2.609 inches, the greatest width dimension (pin head to opposite pin head) being 1 15/16 inches. The channel 40 illustrated in FIG. 9 has an exterior width of 3.0 inches, an interior width at the web base of approximately 2.38 inches and an interior width at the top of the flanges of approximately 2.75 inches. The cap 12 has an exterior width at the base of the legs of approximately 2.135 inches and 2.5 inches at the top of the legs so that, when the cap is centered within the channel as shown in FIG. 9, there is a clearance or gap between each of the legs of the cap and the corresponding channel flange of approximately 0.125 inch. Thus, the legs of caps 12 substantially fill the gap between the flanges of the channel guide and the chain thereby eliminating the above noted problems previously encountered during the loading operation.

Figure 10:
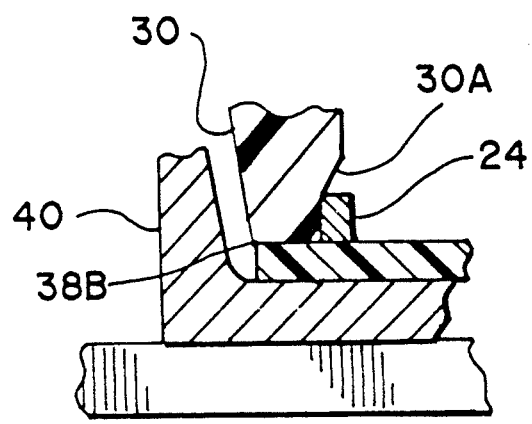
FIG. 10 is a fragmentary view showing a cap leg bottom portion in a fully worn condition.

It should further be noted that the width of the bottom surface of the legs of the cap is greater than the side plate thickness (0.155 inch) of 81X chain, the leg bottom surface width for caps affixed to pin links being 0.187 inch and for caps affixed to roller links being 0.375 inch. This increased width aids in the distribution of vertical load forces. Such, coupled with the less abrasive characteristic of the polymer material (as compared to the steel side plates), substantially eliminates groove cutting problems noted above. In this regard it will further be noted that, as the bottom portions of the cap legs wear away over time, such wearing away will cease when the bottom surfaces of the legs become flush with the bottom surfaces of the side plates as illustrated in FIG. 10. At that point it should be noted that the effective width of the bottom surfaces of the legs increases by the thickness of the side plates.

While preferred constructional features of the invention are embodied in the structure illustrated herein, it is to be understood that changes and variations may be made by those skilled in the art without departing from the spirit and scope of the appended claims.

What is claimed is:

1. Apparatus for conveying articles comprising chain support means of channel shaped configuration having a bottom web portion and spaced apart flanges upstanding therefrom, and roller chain disposed between said flanges above said web portion, said chain including a link having a pair of spaced apart side plates, there being free space between said plates and said flanges when said link is centered between said flanges, and a link attachment for engaging articles to be conveyed, said link attachment comprising a body of polymer material having an upper portion overlying said link, spaced apart legs depending from said upper portion and disposed between and substantially filing said space between said flanges and said side plates, said legs providing surfaces to captively engage said plates therebetween in the absence of outward flexing of said legs relative to said plates, each of said legs having a reduced thickness portion adjacent said upper portion to enable outward flexing thereof upon application of force thereto whereby said link attachment may be engaged and disengaged from said one of said links, said legs having free ends providing bottom surfaces to slidably engage said bottom web portion.

2. Apparatus in accordance with claim 1 wherein the plate engaging surfaces retain said plates in slightly elevated relation to said web portion.

* * * * *